Oct. 11, 1960　　　　A. J. ENSOR　　　　2,955,770
APPARATUS SUITABLE FOR THE WINDING OF WIRES AND YARNS
Filed Oct. 18, 1954　　　　　　　　　　5 Sheets-Sheet 1

INVENTOR
Alfred Joseph Ensor
BY
Leech and Rodue
ATTORNEYS

Oct. 11, 1960    A. J. ENSOR    2,955,770
APPARATUS SUITABLE FOR THE WINDING OF WIRES AND YARNS
Filed Oct. 18, 1954    5 Sheets-Sheet 2

INVENTOR
Alfred Joseph Ensor
BY
Leach and Rodue
ATTORNEYS

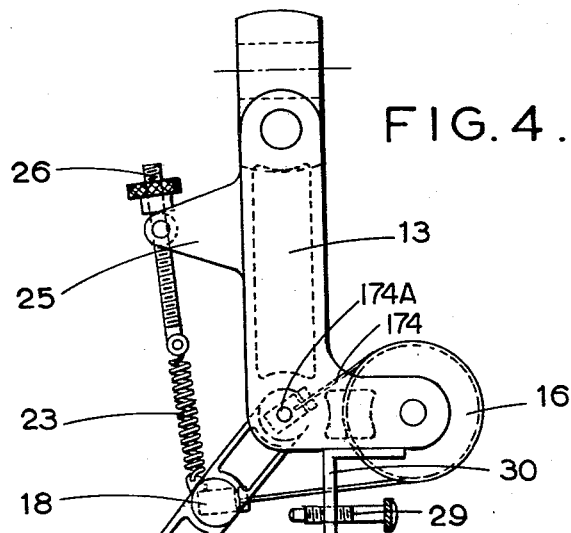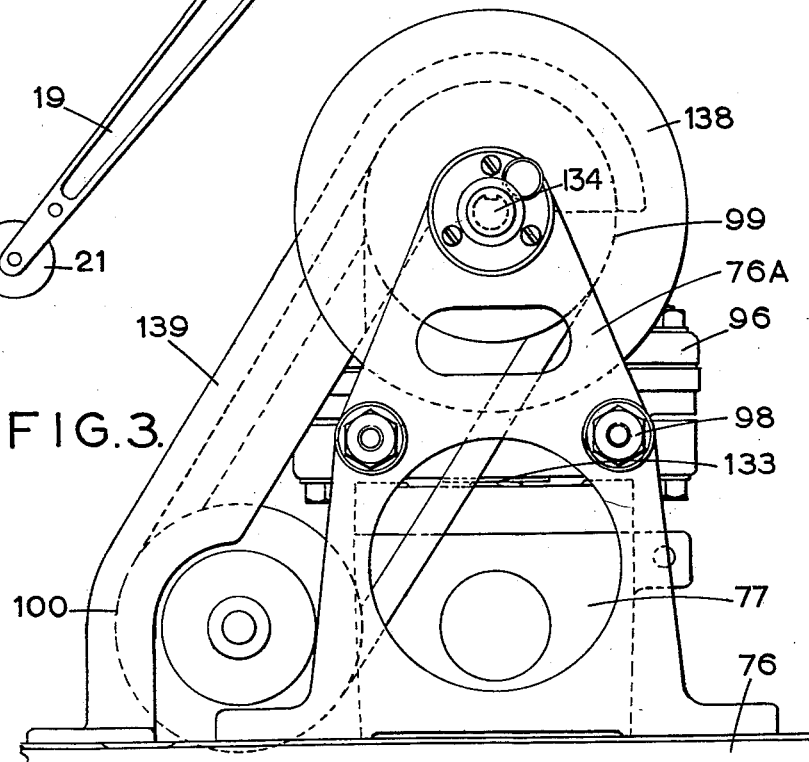

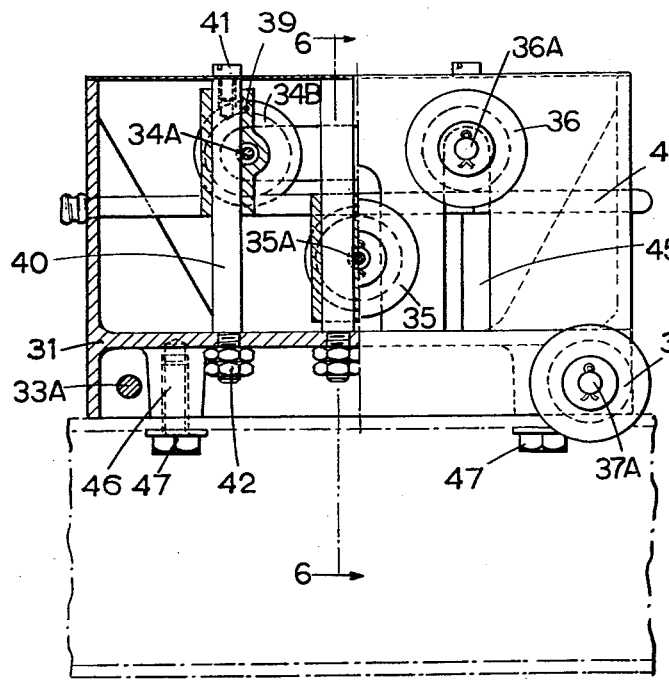

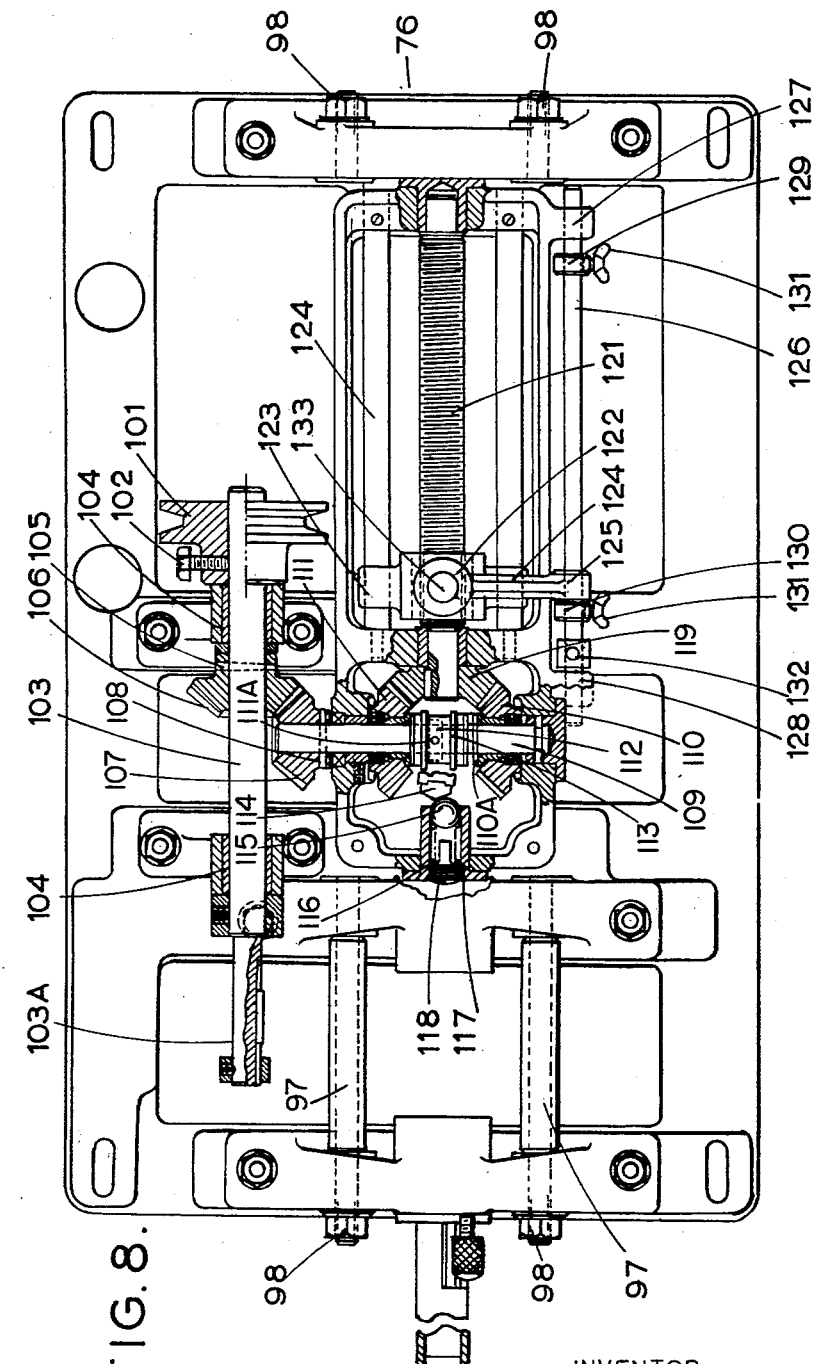

United States Patent Office 2,955,770
Patented Oct. 11, 1960

2,955,770
APPARATUS SUITABLE FOR THE WINDING OF WIRES AND YARNS

Alfred Joseph Ensor, 42 Yeading Lane, Hayes, England

Filed Oct. 18, 1954, Ser. No. 463,006

Claims priority, application Great Britain Mar. 4, 1954

6 Claims. (Cl. 242—25)

There are certain processes for dealing with yarns or wires in which as a step, usually a preliminary step, two or more yarns or wires (hereinafter, for convenience, referred to as "ends") are assembled side by side without being twisted together and are wound on a reel from which, at a later stage in manufacture, they are drawn off as a group. An example of manufacture in which this step occurs is braiding in those cases where each element of the braid consists of two or more "ends" so that each bobbin in the braiding machine is required to supply to the braid a group consisting of two or more ends lying side by side.

In such a process it may be important that the lengths of all the ends delivered by a given rotation of the bobbin on which the group of ends is carried should be uniform. In some cases the ends may be of such a nature (textile yarn or ductile wire) that by stretching they can accommodate some non-uniformity but this can be ruinous to the finished product because the ends, for example ductile wire, may have been stretched beyond their yield point, but there are other cases in which the ends (for instance high tensile wire of steel or bronze) are such that accommodation cannot be given in this way and any excess length in one or more of the ends would cause looping, fouling, crossovers and in extreme cases can only be disposed of by cutting and shortening and rejoining, which is always inconvenient and may in some cases be not permissible, for instance where the tensile strength of the end is of importance.

The present invention provides apparatus for carrying out a step of the kind described in which all the ends fed to a take-up reel go to it at a uniform rate so that, even if the turns do not lie smoothly on the reel, the lengths of the ends coming off at the later stage of manufacture for a given rotation of the reel are uniform.

The improved apparatus comprises a jockey wheel arrangement one for each end interposed between the supply reel for the end and the place of assembly of the ends and spring loaded so as to take up any slack in the end, a metering wheel between the place of assembly and the take-up reel round which each end passes and which has a non-slip surface so that the ends will not slip on the wheel surface and ensuring that uniform lengths of each end are fed to the take up bobbin or reel for a given rotation of the metering wheel.

Preferably the bobbin or take-up reel upon which the wires are being wound is caused to reciprocate during the winding process so that it travels axially in one direction while one layer is being wound upon it and in the other while the next layer is being wound on. This avoids the tendency of the wire windings to be turned over on each other at the ends of the bobbin a tendency which is particularly present in this device because each winding in each layer is of the same length as its fellows and therefore the windings may not lie evenly on the bobbin.

The non-slip surface on the metering wheel may be provided in various way,

The said surface may be roughened so as to oppose a frictional resistance to slipping. Thus it may be of metal knurled or otherwise roughened or it may be covered by frictional material such as Carborundum or other grit either applied to the metering wheel direct or by means of adhesive or by means of a grit impregnated cloth affixed to the metering wheel.

Alternatively for use with ferrous wires the metering wheel may be magnetised, preferably electro-magnetically, by which means the wires will be held to the wheel and to each other.

By giving a non-slip surface to the metering wheel not so much tension is required to hold the wires onto the wheel. The risk of exceeding the yield point on a single end of wire is much reduced.

To ensure further that the ends lie on the metering wheel a pressure wheel preferably having a soft surface may be provided to act upon the group of ends and hold them to the surface of the metering wheel or it may be dispensed with unless the wire being wound is of heavy gauge.

The jockey pulleys may consist of a series of wheels over and under which the end passes alternately. These pulleys may be carried on spindles, the spindles sliding in slots approximately normal to the line of travel of the ends, and each spindle is urged by spring means in the opposite direction to that in which the end urges it. That is to say that if the end passes over the wheel to turn it downward the spindle is urged upwards and vice versa. The spring means may be rubber cords passing over and under other wheels on the spindle in the opposite way to that of the end.

An example of this invention is illustrated in the accompanying drawings in which Figure 1 is a side elevation of a bobbin winding apparatus according to this invention.

Figure 3 is a view on an enlarged scale of the apparatus which carries the bobbin on which the wires are wound.

Figure 4 is a view on an enlarged scale of the brake releasing apparatus shown in Figure 1.

Figure 5 is an elevation of a jockey wheel arrangement, partially in central vertical section on line 5—5 of Figure 7.

Figure 6 is a central transverse section taken on line 6—6 of Figure 5.

Figure 7 is a plan view of the jockey wheel arrangement.. In each case a part of the box is cut away to show the parts inside.

Figure 8 is a view partly in section of the interior of the gear box containing the reciprocating gear.

10 is the frame of the apparatus having two upright metal bars 11 to which are secured by suitable clamping pieces 12 a series of brackets 13 on each of which can be mounted a coil of wire or the like wound on a supply reel shown at 14.

Figure 2:
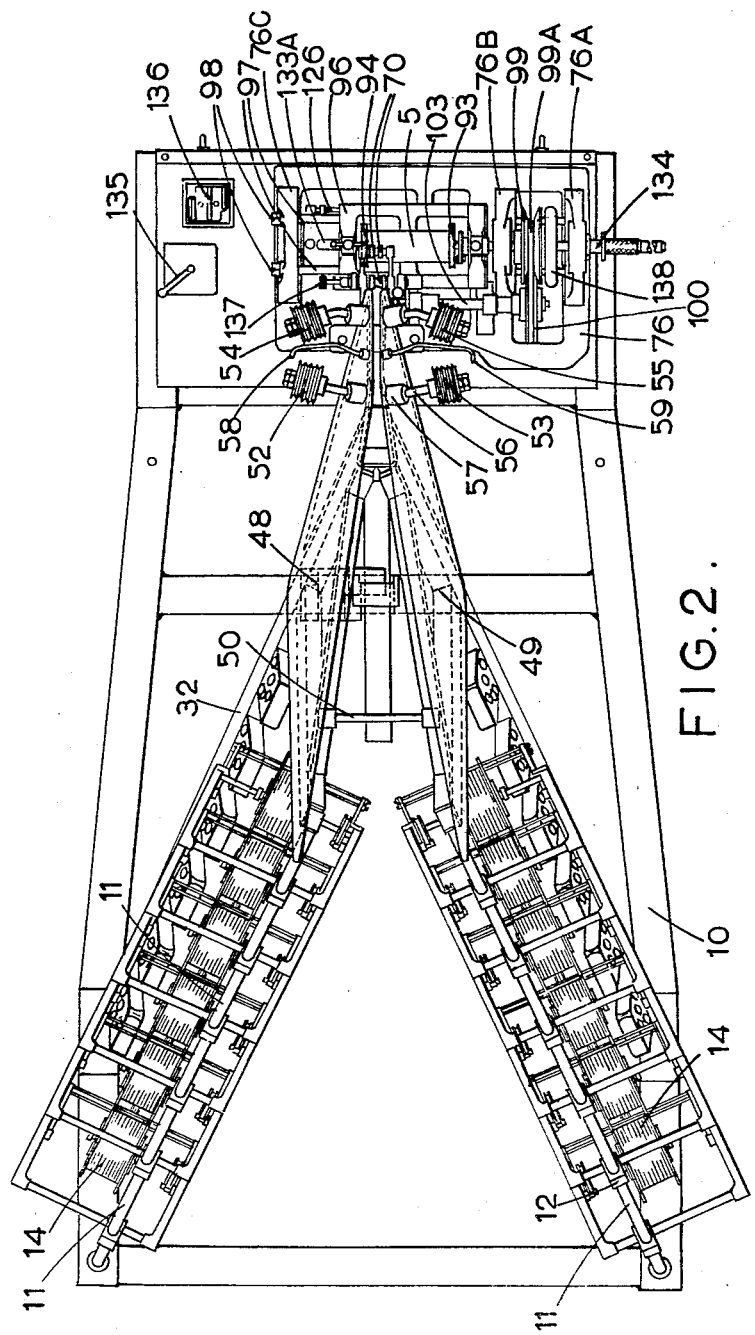
Figure 2 is a view of the apparatus illustrated in Figure 1 seen from above.

In this way as will be seen, from Figure 2, on each of the bars 11 can be mounted six coils.

Connected to each spindle which carries one of the coils 14 is a brake drum 16 (see Fig. 4) mounted on part of the bracket 13.

Around the drum as shown in Fig. 4 is brake band 17 one end of which is fixed at 17A and the other end is connected at 18 with one of a pair of similar, spaced levers 19, fulcrumed on the bracket and free to swing around their fulcrums.

The arms 19 are joined by two rods 20 on one of which is freely mounted a wheel 21 over which passes the wire 38 coming off the corresponding coil 14.

The downward displacement of the arms 19 is limited by an adjustable stop member 29 (Fig. 4) attached to a bracket 30 on bracket 13.

The arms are urged upwards by a spring 23 attached to an adjustable member 26 fulcrumed on a bracket 25 on bracket 13.

The pull of the wire over the wheel 21 will urge the arms downwards. This movement frees the band brake and allows the wire to be pulled off the coil. Should, however, the pull of the wire be reduced the tension on wheel 21 will be reduced and the arms will be pulled upwards by spring 23 thus pulling on the end of the brake tending to stop rotation of the coil and its supply reel.

Each wire leaving wheel 21 passes through a jockey wheel arrangement now to be described and illustrated more particularly in Figures 5, 6 and 7.

Each jockey wheel arrangement is contained in a box 31 secured to a girder 32 forming part of the frame of the machine.

Mounted on the outside of the box are five wheels, 33, 34, 35, 36 and 37 and the wire which leaves the coil and passes over wheel 21 and is shown at 38, passes under wheel 33, over wheel 34, under wheel 35, over wheel 36, and under wheel 37.

Wheels 33 and 37 are carried on spindles 33A and 37A which are rigidly mounted in the box 31, the spindles projecting through the front and backwalls of the box.

Wheels 34, 35 and 36 are carried on spindles 34A, 35A and 36A which are journaled on sleeve members 39, sliding freely on upright bars 40 passing between the top and the bottom of the box secured at the top by screws 41 and at the bottom by nuts 42.

Spindles 34A and 36A are connected together by a bar 43.

On each of the spindles 34A, 35A and 36A is freely mounted a pair of wheels 34B, 35B and 36B.

A rubber cord 44 is passed through box 31 from the left hand end as viewed in Figure 7, out through the right hand end and back again to the left hand end of the box where it projects through the latter end of the box. The ends of the rubber cord 44 are secured by grips 45.

The cord passes under the wheels 34B, over the wheels 35B, under the wheels 36B. It will thus be seen that the rubber cord 44 exerts a pull on each of the three spindles 34A, 35A and 36A which is in opposition to the pull which the wires exercise on the spindles through the wheels 34, 35 and 36. Any variations of tension in the wire will accordingly be taken up by movement of the spindles in the box.

Figure 1:
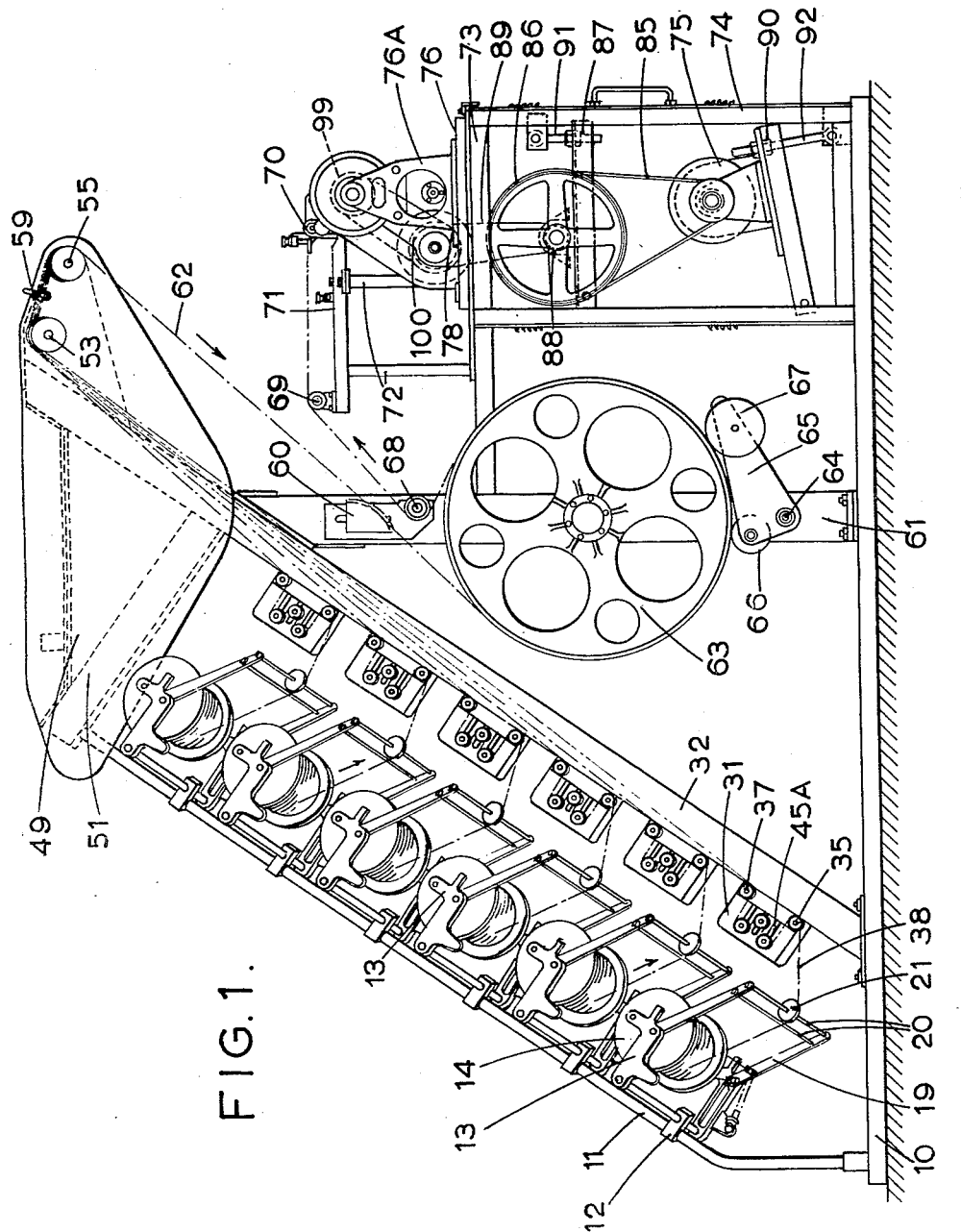

Slots 45A in the front of the box as viewed in Figures 5, and 1, permit this movement.

As shown in Figures 5 and 6 the box 31 is secured to the girder 32 by bosses 46 and set screws 47, wheel 33 being removed in Figure 5 to show these members.

At the top of the apparatus are two brackets 48 and 49 joined together by a bar 50 and supported by the rods 11, girders 32 and girders 51 which connect the girders 32 with the rods 11.

On these brackets are mounted two sets of sheaves 52, 53, 54 and 55. Each of these sheaves is carried on a bar 56 which is mounted on the bracket by adjustable bushing 57.

The wires coming from the six coils mounted on rod 11 shown in Figure 1, and the lower half of Figure 2, pass over the sheaves 53, and 55, those coming from the other six coils pass over the sheaves 52 and 54.

In Figure 2 the wires passing over the sheaves have been omitted but they are shown in dotted lines in Figure 1.

Immediately over each set of wires as they pass between the sheaves are mounted arms 58 and 59. These arms may be used in well known manner to connect a relay circuit to cut off the motor if a wire breaks and comes into contact with one of them.

The wires leaving the sheaves 54 and 55 pass over a guide 60 mounted on an upright member 61 of the frame connected at its top to the girder 32. The wires are shown in dotted lines at 62 and are contiguous to form a flat band. They then pass as a flat band round the metering wheel 63 which is freely mounted on the upright 61. It is this wheel which is covered with a non-slip surface which is an important feature of this invention. This surface must be non-resilient to insure equal lengths of the wires about the wheel irrespective of different tensions thereon. It must also insure against slippage of any wire in relation to the others. A non-slip surface thereon may be achieved by roughening so as to impose a frictional resistance to slipping. Thus it may be knurled or otherwise roughened or it may be covered or impregnated with friction material such as Carborundum or other grid either applied to the metering wheel direct or by means of adhesive or by means of a grid impregnated fabric affixed to the metering wheel.

Alternatively for use with ferrous wires the metering wheel may be magnetized, preferably electro-magnetically, by which means the wires will be held to the wheel and to each other.

Mounted on upright 61 on the spindle 64 is a bracket 65 which carries a wheel 66 with surface of yielding material held against the surfaces of the wires, going round the wheel 63, by a counter weight 67. Pressure of wheel 66 helps to retain the wires on the wheel surface.

The wires having traversed wheel 63 pass over pulley wheels 68 and 69 over two pulleys 70 and on to the bobbin 5 on which they are to be wound.

The pulley wheel 68 is mounted on girder member 61, pulley wheel 69 on a bracket 71 supported on pillars 72 of a cross member of the frame 73, in turn supported on a box 74 which houses the electric motor 75 which provides the power for driving the apparatus.

Also mounted on top of box 74 is a plate 76 carrying three brackets 76A, 76B, 76C and a gear box shown at 77 which contains a reversing gear.

The drive is transmitted from the motor 75 through a belt 85, pulley wheel 86 mounted on a bracket 87 in box 74, a second pulley wheel 88 on the same spindle and belt 89 (shown in dotted lines in Figure 1).

Bracket 87 on which are mounted the wheels 86, 88 and another bracket 90 on which is mounted the electric motor 75, are adjustable about fulcrums by bolts shown at 91 and 92 by which the tension on the belts can be adjusted.

The bobbin 5 to be wound is mounted on centres 93 and 94 which are carried in a travelling carriage 96 slidable on two rods 97 which extend between the brackets 76A, B and C, and are secured at their ends by nuts 98.

The centre 93 is driven through pulley 99 which is of the variable speed type and by a belt 99a, from a pulley 100 shown in dotted lines and is caused to reciprocate by the reversing gear which is contained in box 77 which is illustrated in Figure 8.

101 is a pulley driven by the belt 89 from pulley 88 and keyed by a set screw 102 to a shaft 103 supported in two sets of bearings 104 from the fixed structure. At the other end of shaft 103 marked 103A in Fig. 8 is mounted pulley 100.

Keyed to shaft 103 by key 105 is a bevelled pinion 106 (in Figure 2 the shaft is shown without this pinion). Pinion 106 engages in a second pinion 107 keyed by key 108 to a shaft 109 supported from the fixed structure.

Freely mounted for rotation on shaft 109 are a pair of bevelled pinions 110 and 111.

Rigid with each of these pinions is a member of a dog clutch 110A and 111A.

Splined to shaft 109 is a sleeve 112 having internally a collar 13 and at either end a complementary member of the dog clutch adapted to engage in one or other of the dog clutch members 110A and 111A.

A fork, not shown, engages in the collar 113 and articulated to the fork is a point ended pin 114 engaged by the ball 115 urged by the spring 116 against the end of the pin.

Spring 116 is mounted in a sleeve 117 carried in the fixed structure, the strength of which is adjustable by a screw member 118 threaded into the outer end of the sleeve.

Pin 114 and ball 115 form a toggle device of well known form which ensures that the sleeve member 112 will not stop between the positions in which it engages either the dogs 110A or 111A.

In mesh with the bevel wheels 110 and 111 is another bevelled pinion 119 keyed to shaft 120. Shaft 120 carries on it a thread 121 and is itself carried in journals in the fixed structure.

122 is a nut member engaged with the thread 121 and prevented from rotation by an extension 123 through which is a hole which embraces the rod 124 fixed to the structure and having sufficient clearance to allow extension 123 to slide freely along rod 124 as it traverses the same.

On the opposite side to extension 123, nut 122 carries an arm 124 having through its end 125 a hole which embraces a bar 126 which is mounted slideably in two brackets 127 and 128 on the fixed structure.

Adjustable on bar 126 are two rings 129 and 130 each adapted to be slid axially along the rod, but made rigid thereto by means of a butterfly screw carried by each, shown at 131.

Carried rigidly on rod 126 is a nut 132 which is connected to a lever (not shown) fulcrumed intermediately and carrying a fork which engages in the collar 113.

The way the gear box works is as follow: Shaft 109 is driven from the motor through shaft 103, and pinions 106 and 107. This in turn will drive thread 121 through one of the pinions 110 or 111, in accordance with which pair of dog clutches is engaged. In the drawing as the clutch 111A is engaged the drive will be through pinion 111. This will cause nut 122 to travel along the thread until the end 125 of arm 124 strikes ring 129. This displaces rod 126 to the right, disengaging dog clutches 111A and engaging dog clutches 110A.

The drive will now be taken through pinion 110 the direction of movement accordingly of the nut 122 being reversed until the end 125 of arm 124 strikes ring 131 and again throws over sleeve 112.

The nut 122 has a pin 133 which projects through the top of the gear box through a slot 133A and engages the travelling carriage 96 which is accordingly caused to reciprocate with the nut. This causes the bobbin 5 which is being wound to be reciprocated, one layer being wound in one direction and the other in the other.

Centre 93 is carried on a shaft 134 which is slidably keyed to pulley 99 so that it will continue to be driven while reciprocating with the carriage.

In Figure 2 is an isolator switch 135 and a "stop" and "start" switch to the motor at 136. A knurled headed screw is shown at 137 by which one of the guide wheels 70 can be adjusted. A hand wheel 138 is carried by spindle 134 to adjust the same by rotation.

A guard 139 is attached to member 76 to guard pulleys 99 and 100.

What I claim is:

1. Apparatus for winding a plurality of substantially inextensible ends simultaneously onto a bobbin at a uniform rate comprising in sequence a supply reel for each of said ends; means associated with each reel to maintain a drag on the end delivered thereby; a separate jockey wheel arrangement for each end constructed to provide automatically adjustable quantity and energy storage therefor; guide means to assemble all said ends parallel and contiguous into a flat band; a free running metering wheel of large diameter arranged to pass said band circumferentially about its periphery for less than one turn, said wheel having a rigid, incompressible, peripheral surface constructed to simultaneously deliver uniform lengths of ends per turn irrespective of tension differences on the ends; and means to deliver said band with the ends contiguous from said wheel to a single winding bobbin.

2. The apparatus as defined in claim 1 in which the incompressible surface of the metering wheel is provided with non-slip means.

3. The apparatus as defined in claim 1 in which the incompressible surface of the metering wheel is knurled.

4. The apparatus as defined in claim 1 in which the metering wheel is surfaced with grit.

5. The apparatus as defined in claim 1 in which the incompressible surface of the metering wheel is relatively smooth, in which the ends are made of magnetic material and in which the said surface and wheel rim are suitably magnetized to prevent the ends slipping thereon.

6. Winding apparatus as claimed in claim 1 in which means is provided to reciprocate the bobbin during the winding process so as to travel axially in one direction while one band layer is being wound on to it and in the other direction whilst the next layer is being wound on to it, the arrangement being such that the strands advance rectilinearly from said delivery means onto the bobbin without substantial lateral deviation.

References Cited in the file of this patent

UNITED STATES PATENTS

| | | |
|---|---|---|
| 824,292 | Gerhard | June 26, 1906 |
| 1,142,531 | Royle | June 8, 1915 |
| 1,762,476 | Houghton | June 10, 1930 |
| 1,826,758 | Field | Oct. 13, 1931 |
| 1,882,539 | Anderson | Oct. 11, 1932 |
| 2,159,635 | Ranney | May 23, 1935 |
| 2,171,741 | Cohn et al. | Sept. 5, 1939 |
| 2,250,234 | Pierce | July 22, 1941 |
| 2,560,204 | Andren | July 10, 1951 |
| 2,717,125 | Rayburn | Sept. 6, 1955 |